United States Patent
Hu et al.

(10) Patent No.: US 10,982,131 B2
(45) Date of Patent: *Apr. 20, 2021

(54) PHASE TRANSITION MATERIAL FLUID AND PROPPANT FORMED THEREFROM

(71) Applicant: PetroChina Company Limited, Beijing (CN)

(72) Inventors: Shubao Hu, Beijing (CN); Yong Yang, Beijing (CN); Liqiang Zhao, Beijing (CN); Guohua Liu, Beijing (CN); Mengmeng Ning, Beijing (CN); Kun Xu, Beijing (CN); Juan Du, Beijing (CN); Ning Li, Beijing (CN); Lina Zhang, Beijing (CN); Yuanzhao Jia, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,765

(22) Filed: Mar. 27, 2019

(65) Prior Publication Data
US 2019/0300777 A1 Oct. 3, 2019

(30) Foreign Application Priority Data
Mar. 28, 2018 (CN) .......................... 201810261749.X

(51) Int. Cl.
*C09K 8/68* (2006.01)
*C09K 8/64* (2006.01)
*C09K 8/60* (2006.01)
*C09K 8/80* (2006.01)

(52) U.S. Cl.
CPC ................ *C09K 8/64* (2013.01); *C09K 8/604* (2013.01); *C09K 8/80* (2013.01)

(58) Field of Classification Search
CPC . C09K 8/64; C09K 8/604; C09K 8/80; C09K 8/68; C09K 8/882; C08J 2345/00; C08J 9/0066; C08J 2401/28; C08J 9/0033; C08J 2203/04; C08J 9/0061; C08J 2429/04; C08J 2203/02; C08J 9/102; C08J 9/08; C08J 3/246; C08J 9/0028; C08J 9/141; C08J 9/142; C08J 2201/0502; C08J 2203/12; C08J 2201/042; C08J 2203/14; C08L 45/00; C08K 13/02; C08K 2003/162; C08K 5/41; C08K 5/34922; C08K 2003/329
See application file for complete search history.

(56) References Cited

U.S. PATENT DOCUMENTS

| | | | |
|---|---|---|---|
| 2010/0178420 A1* | 7/2010 | Lee ........................ | C09D 11/52 427/99.2 |
| 2012/0103615 A1 | 5/2012 | Scherman et al. | |
| 2012/0220725 A1 | 8/2012 | Hidalgo | |
| 2016/0130498 A1 | 5/2016 | Afanasiev et al. | |
| 2017/0247296 A1* | 8/2017 | Salla ..................... | C09K 8/467 |
| 2018/0340166 A1 | 11/2018 | Zhao et al. | |
| 2019/0003294 A1 | 1/2019 | Zhao et al. | |

FOREIGN PATENT DOCUMENTS

| | | | |
|---|---|---|---|
| CN | 102598148 A | | 6/2012 |
| CN | 105971579 | * | 9/2016 |
| CN | 106190086 | * | 12/2016 |
| CN | 106190086 A | | 12/2016 |

OTHER PUBLICATIONS

Shao-yan Mou et al.; Overview of Fracturing Proppants; Chinese Journal of Engineering; vol. 38, No. 12, p. 1659-1664. Dec. 2016.
Chinese Search Report dated Feb. 5, 2018.

* cited by examiner

Primary Examiner — Kumar R Bhushan
(74) Attorney, Agent, or Firm — Harness, Dickey & Pierce, P.L.C.

(57) ABSTRACT

Provided are a phase transition material fluid and a proppant formed therefrom, wherein the components for preparing the phase transition material fluid comprise in percentages by mass: a supramolecular building block 10 to 60 wt %, a supramolecular functional unit 20 to 50 wt %, a dispersant 0.1 to 2 wt %, an inorganic co-builder 0.1 to 1 wt %, an initiator 0.1 to 1 wt %, the balance being a solvent. The supramolecular building block comprises a melamine-based substance and/or a triazine-based substance; the supramolecular functional unit comprises a dicyclopentadiene resin; and the dispersant includes a hydroxyl-bearing polysaccharide substance and a surfactant. After the phase transition material fluid enters the reservoir, it may form a solid substance to prop the fracture under the action of supramolecular chemistry and physics.

20 Claims, No Drawings

PHASE TRANSITION MATERIAL FLUID AND PROPPANT FORMED THEREFROM

CROSS-REFERENCE TO RELATED APPLICATIONS

This application claims priority to Chinese Patent Application No. 201810261749.X, filed on Mar. 28, 2018, which is hereby incorporated by reference in its entirety.

FIELD

The invention belongs to the technical field of oil reservoir exploitation, and particularly relates to a phase transition material fluid and a proppant formed therefrom.

BACKGROUND

As a main measure for stimulating oil and gas well and water injection well, the hydraulic fracturing technology has been widely used in the exploitation of oil and gas fields, and has made important contributions to the stable production and injection of oil and gas fields. The hydraulic fracturing is to pump a high-viscosity preflush to a target reservoir to form fractures and extend at high pressure, and then pump a sand-laden fluid incorporating a proppant. The carrier fluid can continue to extend the fractures while carrying the proppant into deep fractures. Optimally, the fracturing fluid is gel broken and degraded to a low-viscosity fluid, flows to the bottom of the well, and flows back, leaving a flow channel having a high conductivity formed by the proppant propping of fractures in the formation, so to facilitate the flow of oil and gas from the far well formation to the bottom of the well.

However, as seen from the hydraulic fracturing technology and its development, currently all fracturing techniques are based on fracturing by liquid fracturing fluid and then injecting proppant into the hydraulic fracture to prop the fracture to keep the fracture open, so as to obtain a flow channel having a high conductivity. The conductivity of the HIWAY high-speed channel flow proposed by Schlumberger in 2010 is not affected by the permeability of the proppant. As compared with the conventional fracturing technology, this technology also needs to inject the proppant into the formation, and the process for implementation is complicated.

The purpose of hydraulic fracturing is to transform the radial flow converged in the wellbore into a linear flow in the diversion fracture that communicates with the wellbore. The-conductivity in the fracture must be much greater than the conductivity in the formation. In order to obtain the fracture with high permeability, the proppant must be added. The role of the proppant is to prop both walls of the fracture, so that the bottom pressure drops below the closing pressure, and the diversion fracture leading to the oil and gas wellbore remains open, when the pump is stopped. Since the hydraulic fracturing emerged since the late 1940s, its proppant has been developed for more than half a century, and the used proppant can generally be divided into two types, natural and artificial. The former is represented by quartz sand, and the latter is mainly electrolytic, sintered ceramsite. The relative density of quartz sand is low (about 2.65), which is convenient for construction pumping, but the quartz has low strength and is easily broken. The ceramsite has high strength and high relative density (2.7 to 3.6), which places higher requirements on the performance of the fracturing fluid and the pumping conditions. Moreover, during the construction process, the injection of the proppant is prone to cause sand removal, sand blockage, injection failure and the like, so that the construction can not achieve the expected effect, and even the wellbore is blocked by sand. For this reason, petroleum workers have been focusing on the research of low-density, high-strength proppants in order to make the proppant easy to inject. No matter whether it is a low-density or high-density proppant, it is necessary to inject proppant from the wellhead into the formation, and the proppant will have problems of being difficult to inject and injecting difficultly during the conventional sand fracturing construction process.

Conventional hydraulic fracturing construction is likely to cause sand removal, sand blockage, and injection failure in the injection of the proppant, so that the construction can not achieve the expected effect, and even the wellbore is blocked by sand. For this problem, CN105971579 discloses a phase transition hydraulic fracturing process, wherein a material fluid, in which a phase transition may take place, is injected into the fracture after the fracturing, and the material fluid forms-proppant after the phase transition (supramolecular self-assembly) at the formation temperature to prop the fracture wall, so as to form a channel of high conductivity in the formation. Although this process solves some of the main problems in injection of the proppant during conventional hydraulic fracturing, it also has some drawbacks: on the one hand, the proppant (solid particles) obtained by phase transition lacks toughness, and may be easily broken, blocking the gap between the solid particles, affecting the conductivity of the propped fracture; on the other hand, the reaction rate for the phase transition material fluid forming the proppant is slow, and it takes a long time for construction work, but during this period, once the phase transition material has not changed phase into the proppant having a certain pressure resistance before the fracture is closed, the phase transition fracturing process will fail.

SUMMARY

In order to solve the above problems, an object of the present invention is to provide a phase transition material fluid.

Another object of the present invention is to provide a proppant formed from phase transition of the phase transition material fluid.

In order to achieve the above object, the present invention provides a phase transition material fluid, wherein the components for preparing the phase transition material fluid comprise in percentages by mass: a supramolecular building block 10 to 60 wt %, a supramolecular functional unit 20 to 50 wt %, a dispersant 0.1 to 2 wt %, an inorganic co-builder 0.1 to 1 wt %, an initiator 0.1 to 1 wt %, the balance being a solvent;

the supramolecular building block comprises a melamine-based substance and/or a triazine-based substance;

the supramolecular functional unit comprises a dicyclopentadiene resin; and the dispersant includes a hydroxyl-bearing polysaccharide substance and a surfactant.

The phase transition material fluid provided by the present invention may be formulated on the ground, have low viscosity and good flowability, and can be easily injected into the formation. When the phase transition material fluid enters the reservoir and reacts at the formation temperature (typically 60 to 120° C.) for a period, the components in the fluid can be self-assembled (theory of entropy-driven orderness for supramolecular materials) to the proppant with a certain strength and toughness to prop the fracture. As compared with the existing phase transition proppant, the solution provided by the present invention introduces polymerization reaction in the space of supramolecular self-assembly to have a synergetic effect of physical and chemical crosslinking, so that the toughness of the product is improved, and the time for the material fluid to form the proppant is reduced.

As for the preparation of the phase transition material fluid, there is no special requirement, as long as the components are added to the solvent and stirred uniformly. In addition, in the preparation of the above phase transition material fluid, those skilled in the art can add some conventional auxiliary agents in the supramolecular self-assembly reaction as needed.

In the fracturing application, the conventional way is to inject the phase transition material fluid after the fracture is formed by the fracturing fluid, but the use of the phase transition material fluid according to the present invention is not limited to this specific way. Further, when injecting the phase transition material fluid, it may be injected separately, or carried by a conventional fluid (not phase transition fluid). In general, most fluids that do not react with the phase transition material fluid can be used as a carrier fluid, and may be selected from conventional fracturing fluids, seawater, formation water or surface water.

In the above phase transition material fluid, preferably, the components for preparing the phase transition material fluid comprise in percentages by mass: the supramolecular building block 30 to 40 wt %, the supramolecular functional unit 20 to 30 wt %, the dispersant 0.5 to 1 wt %, the inorganic co-builder 0.5 to 1 wt %, the initiator 0.5 to 1 wt %, the balance being the solvent.

In the above phase transition material fluid, the supramolecular building block is a base material for supramolecular self-assembly, and those skilled in the art can select a suitable compound from two types of common basic assembly materials, melamine-based substance and triazine-based substance.

In a preferable embodiment provided by the present invention, the melamine-based substance may be selected from melamine, alkenyl-substituted melamine or esterified melamine; the triazine-based substance may be selected from triazine or alkenyl-substituted triazine. As compared with the melamine or triazine, the substituted or esterified substance does not only have an adjustable solubility, but also has increased physical and chemical crosslinking sites, so that the system may be more stable, the self-assembly speed may be faster, and the produced solid material not only has high strength but also better toughness. The above-described alkenyl-substituted melamine and alkenyl-substituted triazine refer to the substance having the hydrogen elements on the amine group substituted.

In a preferable embodiment provided by the present invention, the alkenyl-substituted melamine may be propenyl-substituted melamine; the esterified melamine may be trially 1,3,5-cyanurate. Further, it is preferable to use propenyl-substituted melamine having a substitution degree of 2 to 3.

In a preferable embodiment provided by the present invention, the alkenyl-substituted triazine may be propenyl-substituted triazine; for example, 2,4-diamino-6-diallylamino-1,3,5-triazine. Further, it is preferable to use propenyl-substituted triazine having a substitution degree of 2 to 3.

Further, the alkenyl-substituted triazine and the alkenyl-substituted melamine may be prepared according to conventional methods in the art. In a specific embodiment provided by the present invention, the method for preparing the alkenyl-substituted triazine is: (1) cyanuric chloride is dissolved in a solvent (such as toluene), then an enol is added dropwise thereto at low temperature, and heated and reacted for a while after the completion of the dropwise addition; when the reaction is completed, it is cooled and filtered to collect a precipitate; (2) the precipitate is added to an organic solvent (e.g., dichloromethane) containing an inorganic strong base (e.g., NaOH), and reacted under heating for a while; when the reaction is completed, it is filtered to collect the filtrate. (3) the solvent is distilled off from the filtrate, and the solid is washed and refined (e.g., using a mixed solution of toluene and dichloromethane), to give an alkenyl-substituted triazine product. In a specific embodiment provided by the present invention, the method for preparing the alkenyl-substituted melamine is: (1) melamine is dissolved in a solvent (e.g., N-methylpyrrolidone), a weak base (e.g., potassium carbonate) is added to form a weak alkaline environment, and then a halogenated olefin is added thereto under heating, and the reaction is continued for a while after the completion of the dropwise addition; when the reaction is completed, it is cooled and filtered to collect the filtrate; (2) the filtrate is concentrated to obtain a crude product, and the crude product is washed and refined to obtain an alkenyl-substituted melamine product.

In the above phase transition material fluid, the supramolecular functional unit uses a polymeric material, dicyclopentadiene resin. As compared with the small molecule compound used in the prior art, the present solution introduces a polymerization reaction into the space of supramolecular self-assembly to have a synergetic effect of physical and chemical crosslinking, which improves the toughness of the product and shortens the time for forming the material.

In the phase transition material fluid, the supramolecular building block may further include a building aid; preferably, the building aid comprises one or more of 1,4-butanediol diacrylate, N,N-methylene bisacrylamide and triallyl isocyanurate.

In the above phase transition material fluid, the dispersant used is a mixed dispersion system of a hydroxyl-bearing polysaccharide substance and a surfactant. When the hydroxyl-bearing polysaccharide is used in the system, not only a dispersion can be achieved through the high viscosity of these polymeric materials themselves, but also the hydroxyl in the molecules can assist the supramolecular self-assembly, which accelerates the self-assembly of molecules and shortens the formation time. Further, as for the ratio of the used two kinds of dispersants, one skilled in the art may determine it as required. In a specific embodiment of the present invention, the weight raito of the hydroxyl-bearing polysaccharide substance to the surfactant is (0.1-10):1. In a preferable embodiment provided by the present invention, the hydroxyl-bearing polysaccharide substance includes one or more of hydroxypropyl methylcellulose, polyvinyl alcohol, hydroxymethyl cellulose, ethyl cellulose, and sucrose fatty acid ester.

In the above phase transition material fluid, the role of the surfactant is to assist the stabilization and dispersion of inorganic and organic substances in the system. One skilled in the art can make suitable selections depending on the particular inorganic and organic substances used. In a preferable embodiment provided by the present invention, an anionic surfactant or a nonionic surfactant is selected. Further, the anionic surfactant may be selected from alkyl sulfate surfactants, alkyl sulfonate surfactants or alkylbenzene sulfonate surfactants; still further preferably, the alkyl sulfate surfactants may particularly be in particular sodium dodecyl sulfate, and the alkyl sulfonate surfactants may particularly be sodium dodecyl sulfonate, and the alkylbenzene sulfonate surfactants may particularly be sodium dodecylbenzene sulfonate. Further, the nonionic surfactant may be selected from polyether surfactants; still further, the polyether surfactants may be selected from polyoxyethylene ether surfactants; in particular, it may be an octylphenol polyoxyethylene ether or a nonylphenol polyoxyethylene ether.

In the phase transition material fluid, the inorganic co-builder is used for forming inorganic gel and plays an intermediate role in the supramolecular building, and it may be selected from conventional inorganic co-builders in the art. In a preferable embodiment provided by the present invention, the inorganic co-builder may be sodium bicarbonate, or may be a composition of phosphoric acid and calcium chloride.

In the phase transition material fluid, the role of the initiator is to initiate the polymerization reaction, and the suitable initiator may be selected depending on the reactants. In a preferable embodiment provided by the present invention, a peroxide initiator is selected; specifically, it may be one or more of dibenzoyl peroxide, lauroyl peroxide, cumene hydroperoxide, tert-butyl hydroperoxide, dicumyl peroxide, di-tert-butyl peroxide, tert-butyl peroxybenzoate, tert-butyl peroxypivalate, diisopropyl peroxydi-carbonate, dicyclohexyl peroxydi-carbonate and diethylhexyl peroxydi-carbonate.

In the above phase transition material fluid, the role of the solvent is to assist in dissolving the organic substance, and the suitable solvent can be selected depending on the determined components. In a preferable embodiment provided by the present invention, a benzene-based solvent is selected; specifically, it may be one or more of styrene, divinyl benzene, xylene and toluene.

In the above phase transition material fluid, the components for preparing further comprise a pore-forming agent. The use of the pore-forming agent is another important improvement in the present application. In the solution disclosed in CN105971579, after phase transition, the material fluid forms a solid propping material without pores. During the construction process, the solid propping material formed after the phase transition does not have the conductivity, and in order to have the-conductivity after closure of fractures, it is necessary that the proppants are spaced apart from each other, that is, channel-like propping must be formed. In the phase transition fracturing construction process, the phase transition fluid and the non-phase transition fluid are simultaneously injected into the reservoir, so that the flow channel is empty when the non-phase transition fluid flows out, to form the fracture conductivity. However, during the construction process, the phase transition fluid may accumulate and then phase transition ocrrurs at some local sites, such as some natural branch fracture channels or natural cavern fractured channels. If this happens, the proppant after phase transition is very likely to cause partial blockage. In order to overcome the above defects, it is more effective to improve the post-fracture permeability and the conductivity, to avoid the partial non-circulation after the phase transition caused by the aggregation of the phase transition fracturing fluid. In the present embodiment, the phase transition material fluid comprising the pore-forming agent may form a solid propping material with pores, after the phase transition in the formation; even if the phase transition fracturing fluid is locally aggregated, the fluid could flow through the reservoir via self-generated pores, which can effectively realize the high conductivity of the fracture, and further improve the operation effect of the phase transition fracturing.

In the above phase transition material fluid, the amount of the pore-forming agent is generally from 0.2 to 5 wt %. For the type of the pore-forming agent, either a pore-forming agent of generating gas by heating or a pore-forming agent of hot melt discharge, or a cominabination thereof may be used. In a preferable embodiment provided by the present invention, the pore-forming agent of generating gas by heating is azobisisobutyronitrile and/or ammonium bicarbonate; the pore-forming agent of hot melt discharge comprises one or more of solid paraffin, dodecanol and heptane.

The present invention also provides a proppant, which is a solid product formed after phase transition of the above phase transition material fluid.

The solution provided by the present invention has the following beneficial effects.

(1) As compared with the conventional hydraulic fracturing, the solution of the present invention does not inject proppant into the formation, but injects a phase transition material fluid into the formation that has been fractured. The phase transition material fluid is a flowable liquid on the ground and during the injection. When the phase transition material fluid enters the reservoir, it forms a solid material to prop the fracture, under the action of supramolecular chemistry and physics. Because no solid is injected, the string friction can be effectively reduced, and the requirement on the construction equipment, the ground pipeline and the wellhead and construction string can be reduced, construction costs can be effectively decreased, while the construction risk and safety hazards are reduced.

(2) As compared with the phase transition proppant in the prior art, the solution provided by the present invention does not only shorten the reaction time for forming the proppant, but also allows the produced-proppant to have better toughness.

(3) As compared with the phase transition proppant in the prior art, the self-pore-forming solution provided by the present invention can produce proppant with pores, which itself has fluid conductivity. Even if the phase transition fluid is locally aggregated and phase transition occurs at some local sites, the fluid could flow through via self-generated pores, which can effectively improve the conductivity of the fracture.

DETAILED DESCRIPTION

In order to more clearly understand the technical features, the objects and the beneficial effects of the present invention, the technical solutions of the present invention will now be described in details below, which should not be construed as limiting the implementable scope of the present invention.

Example 1

This Example provides a phase transition material fluid using a melamine-based substance as the supramolecular building block, and a corresponding proppant.

Two phase transition material fluids $HPP_1$ and $HPP_2$ were prepared as follows, respectively.

$HPP_1$: Xylene 50 g was firstly weighed, and then melamine 40 g, dicyclopentadiene resin 30 g, hydroxypropyl methylcellulose 0.5 g, sodium dodecyl sulfate 0.5 g, phosphoric acid 0.5 g, calcium chloride 0.5 g, and dibenzoyl peroxide 1 g were added therein. All of them were placed in a flask, and stirred evenly at room temperature, to complete the preparation of the phase transition material fluid $HPP_1$.

$HPP_2$: Xylene 50 g was firstly weighed, and then 2,4-diamino-6-diallylamino-1,3,5-triazine 40 g, dicyclopentadiene resin 30 g, hydroxypropyl methylcellulose 0.5 g, sodium dodecyl sulfate 0.5 g, phosphoric acid 0.5 g, calcium chloride 0.5 g, and dibenzoyl peroxide 1 g were added therein. All of them were placed in a flask, and stirred evenly at room temperature, to complete the preparation of the phase transition material fluid $HPP_2$.

The proppant was prepared as follows.

The obtained phase transition material fluid each was placed in an oil bath at constant temperature. $HPP_1$ was heated to 90° C. and reacted for 1 hour, and formed a bead-like, bulk solid, that is proppant, designated as $H_1$. $HPP_2$ was heated to 90° C. and reacted for 0.7 hour, and formed a bead-like, bulk solid, that is, proppant designated as $H_2$. It can be seen that the above two phase transition material fluids can realize the transition from liquid to solid, and therefore can be used for phase inversion fracturing.

The above-mentioned proppants $H_1$ and $H_2$ were subjected to performance tests, and the test data were shown in Table 1.

TABLE 1

Performance test data of proppant

| Sample | Bulk density g/cm$^3$ | True density g/cm$^3$ | Breakage rate (%) | | |
|---|---|---|---|---|---|
| | | | Pressure 52 MPa | Pressure 86 MPa | Pressure 96 MPa |
| $H_1$ | 0.49 | 1.03 | ≤0.32 | ≤9.5 | ≤22 |
| $H_2$ | 0.53 | 1.04 | ≤0.3 | ≤8.9 | ≤18 |

Comparing $HPP_1$ with $HPP_2$, the use of allyl-substituted melamine shortens the time for the material fluid to form the proppant in comparison with the use of melamine. The breakage rate of $H_2$ is lower than that of $H_1$ under the same pressure, indicating that $H_2$ has better toughness than $H_1$.

Example 2

This Example provides a phase transition material fluid comprising a pore-forming agent and a corresponding proppant.

Three phase transition material fluids $HPP_3$, $HPP_4$ and $HPP_5$ were prepared as follows, respectively.

$HPP_3$: Xylene 50 g was firstly weighed, and then propenyl-substituted triazine 40 g, dicyclopentadiene resin 30 g, polyvinyl alcohol 0.7 g, sodium dodecyl sulfonate 0.3 g, phosphoric acid 0.5 g, calcium chloride 0.5 g, dibenzoyl peroxide 1 g, and ammonium bicarbonate 5 g were added therein in this order. All of them were placed in a flask and stirred evenly at room temperature to complete the preparation of the underground phase transition material fluid $HPP_3$.

$HPP_4$: Xylene 50 g was firstly weighed, and then propenyl-substituted melamine 40 g, dicyclopentadiene resin 30 g, hydroxypropyl methylcellulose 0.5 g, sodium dodecyl sulphonate 0.5 g, sodium bicarbonate 1 g, di-tert-butyl peroxide 1 g and 5 g of paraffin wax were added therein in this order. All of them were placed in a flask and stirred evenly at room temperature to complete the preparation of the underground phase transition material fluid $HPP_4$.

$HPP_5$: Xylene 50 g was firstly weighed, and then melamine 40 g, dicyclopentadiene resin 30 g, polyvinyl alcohol 0.5 g, nonylphenol polyoxyethylene ether 0.5 g, sodium bicarbonate 1 g, dibenzoyl peroxide 1 g, and dodecanol 5 g were added therein in this order. All of them were placed in a flask and stirred evenly at room temperature to complete the preparation of the underground phase transition material $HPP_5$.

The proppant was prepared as follows.

The obtained phase transition material fluid each was placed in an oil bath at a constant temperature. $HPP_3$ was heated to 100° C. and reacted for 0.5 hour, and formed a bead-like, bulk solid, that is, proppant, designated as $H_3$. $HPP_4$ was heated to 100° C. and reacted for 0.5 hour, and formed a bead-like, bulk solid, that is, proppant, designated as $H_4$. $HPP_5$ was heated to 100° C. and reacted for 0.7 hour, and formed a bead-like, bulk solid, that is, proppant, designated as $H_5$. It can be seen that the above three phase transition material fluids can realize the transition from liquid to solid, and therefore can be used for phase inversion fracturing.

Among them, the propenyl-substituted triazine used in this Example was specifically prepared by the following steps.

In a 250 mL three-necked flask, 4.6 g (25 mmol) of cyanuric chloride was added and dissolved with 15 mL of toluene; it was cooled to 0° C., and then 2.9-5.1 g (50 mmol-87.5 mmol) of propenyl alcohol was added dropwise over 1-3 h. Then it was gradually heated to 80° C. and continued to react for 2 h. It was cooled to room temperature, and filtered to collect the precipitate. 3.0 g of NaOH and 150 mL of dichloromethane were added, and heated until NaOH was completely dissolved, and then heated under reflux for 30 min. It was filtered to collect the filtrate. The solvent was evaporated to dryness, and the crude product was washed with dichloromethane/toluene (1:5, V/V) mixture to give the propenyl-substituted triazine having a substitution degree of 2-3.

The propenyl-substituted melamine used in this Example was specifically prepared by the following steps.

In a 250 mL three-necked flask, 3.2 g (25 mmol) of melamine was added, and dissolved with 30 mL N-methylpyrrolidone; then 6.9-12.1 g (50 mmol-87.5 mmol) of potassium carbonate was added, and heated to 60° C.; 6.0-10.6 g (50 mmol-87.5 mmol) of bromopropene was added dropwise over 1-3 h. Then it was gradually heated to 70° C. and continued to react for 2 h. It was cooled to room temperature, and filtered to collect the filtrate. The solvent was concentrated, and the crude product was washed with diethyl ether/methanol (3:1, V/V) mixture to give the propenyl-substituted melamine having a substitution degree of 2-3.

The above-mentioned proppants $H_3$, $H_4$ and $H_5$ were subjected to performance test. The test data were shown in Table 2.

TABLE 2

Performance test data of proppants

| Sample | Bulk density g/cm$^3$ | True density g/cm$^3$ | Breakage rate (%) | | |
|---|---|---|---|---|---|
| | | | Pressure 52 MPa | Pressure 86 MPa | Pressure 96 MPa |
| $H_3$ | 0.43 | 1.03 | ≤0.33 | ≤9.5 | ≤23 |
| $H_4$ | 0.41 | 1.03 | ≤0.33 | ≤9.5 | ≤23 |
| $H_5$ | 0.44 | 1.04 | ≤0.35 | ≤10 | ≤25 |

Comparing HPP$_3$, HPP$_4$, and HPP$_5$, the use of allyl-substituted melamine shortens the time for the material fluid to form the proppant in comparison with the use of melamine. Since the proppants H$_3$, H$_4$, and H$_5$ have a porous structure, their bulk density is significantly smaller than that of H$_1$ and H$_2$. The breakage rate of H$_2$ is lower than that of H$_1$ under the same pressure, indicating that H$_2$ has better toughness than H$_1$.

The proppants H$_1$ and H$_2$ produced in Example 1 and H$_3$, H$_4$, and H$_5$ produced in this Example were subjected to permeability test. The specific process is as follows.

The proppants H$_1$, H$_2$, H$_3$, H$_4$, and H$_5$ were sieved to give solid particles of 40-60 mesh, and the sieved solid particles were pressed into small cores having a length of 8 cm and a diameter of 2.54 cm with with a core machine under 10 MPa. The small cores were placed in a core flow experimental device to measure its gas permeability. The test results were: $K_{H1}$=483 mD, $K_{H2}$=426 mD, $K_{H3}$=617 mD, $K_{H4}$=633 mD, $K_{H5}$=675 mD. From the test data of five samples, it can be seen that the generation of pores can greatly increase the permeability of the proppants.

Example 3

This Example provides a phase transition material fluid using a melamine-based substance as the supramolecular building block, and a corresponding proppant.

Two phase transition material fluids HPP$_6$ and HPP$_7$ were prepared as follows, respectively.

HPP$_6$: Xylene 45 g was firstly weighed, and then melamine 12 g, dicyclopentadiene resin 60 g, hydroxypropyl methylcellulose 0.5 g, sodium dodecyl sulfate 0.5 g, phosphoric acid 0.5 g, calcium chloride 0.5 g, and dibenzoyl peroxide 1 g were added therein. All of them were placed in a flask and stirred evenly at room temperature to complete the preparation of the phase transition material HPP$_6$.

HPP$_7$: Xylene 20 g was firstly weighed, and then melamine 60 g, dicyclopentadiene resin 20 g, hydroxypropyl methylcellulose 0.5 g, sodium dodecyl sulfate 0.5 g, phosphoric acid 0.5 g, calcium chloride 0.5 g, and dibenzoyl peroxide 1 g were added therein. All of them were placed in a flask and stirred evenly at room temperature to complete the preparation of the phase transition material fluid HPP$_7$.

The proppant was prepared as follows.

The obtained phase transition material fluid each was placed in an oil bath at constant temperature. HPP$_6$ was heated to 90° C. and reacted for 1.5 hours, and formed a bead-like, bulk solid, that is, proppant, designated as H$_6$. HPP$_7$ was heated to 90° C. and reacted for 0.6 hour, and formed a bead-like, bulk solid, that is, proppant, designated as H$_7$. It can be seen that the above two phase transition material fluids can realize the transition from liquid to solid, and therefore can be used for phase inversion fracturing.

The above-mentioned proppants H$_6$ and H$_7$ were subjected to performance test, and the test data were shown in Table 3.

TABLE 3

Performance test data of proppants

| Sample | Bulk density g/cm$^3$ | True density g/cm$^3$ | Breakage rate (%) | | |
|---|---|---|---|---|---|
| | | | Pressure 52 MPa | Pressure 86 MPa | Pressure 96 MPa |
| H$_6$ | 0.51 | 1.03 | ≤3.6 | ≤13.9 | ≤31 |
| H$_7$ | 0.54 | 1.04 | ≤0.28 | ≤7.3 | ≤15 |

Comparing HPP$_6$ and HPP$_7$, due to the difference in the main component content, the formation time has a certain difference, and the shape of the formed proppants is different. Meanwhile, due to the difference in the content, the breakage of the material under pressure is somewhat different.

What is claimed is:

1. A phase transition material fluid, wherein the components for preparing the phase transition material fluid comprise in percentages by mass: a supramolecular building block 10 to 60 wt %, a supramolecular functional unit 20 to 50 wt %, a dispersant 0.1 to 2 wt %, an inorganic co-builder 0.1 to 1 wt %, an initiator 0.1 to 1 wt %, the balance being a solvent;
   the supramolecular building block comprises a melamine-based substance and/or a triazine-based substance;
   the supramolecular functional unit comprises a dicyclopentadiene resin; and
   the dispersant includes a hydroxyl-bearing polysaccharide substance and a surfactant.

2. The phase transition material fluid according to claim 1, wherein the components for preparing the phase transition material fluid comprise in percentages by mass: the supramolecular building block 30 to 40 wt %, the supramolecular functional unit 20 to 30 wt %, the dispersant 0.5 to 1 wt %, the inorganic co-builder 0.5 to 1 wt %, the initiator 0.5 to 1 wt %, the balance being the solvent.

3. The phase transition material fluid according to claim 1, wherein the melamine-based substance includes melamine, alkenyl-substituted melamine, or esterified melamine.

4. The phase transition material fluid according to claim 1, wherein the triazine-based substance comprises triazine or alkenyl-substituted triazine.

5. The phase transition material fluid according to claim 1, wherein the supramolecular building block further comprises a building aid; the building aid comprises one or more of 1,4-butanediol diacrylate, N,N-methylene bisacrylamide and triallyl isocyanurate.

6. The phase transition material fluid according to claim 1, wherein the hydroxyl-bearing polysaccharide substance comprises one or more of hydroxypropyl methylcellulose, polyvinyl alcohol, hydroxymethyl cellulose, ethyl cellulose, and sucrose fatty acid ester.

7. The phase transition material fluid according to claim 1, wherein the surfactant comprises an anionic surfactant or a nonionic surfactant.

8. The phase transition material fluid according to claim 1, wherein the inorganic co-builder includes sodium bicarbonate, or a composition of calcium chloride and phosphoric acid.

9. The phase transition material fluid according to claim 1, wherein the initiator comprises a peroxide initiator.

10. The phase transition material fluid according to claim 1, wherein the solvent comprises benzene-based solvents.

11. The phase transition material fluid according to claim 1, wherein the components for preparing the phase transition material fluid further comprise a pore-forming agent 0.2-5 wt %; the pore-forming agent comprises a pore-forming agent of generating gas by heating and/or a pore-forming agent of hot melt discharge.

12. A proppant, which is a solid product formed after phase transition of the phase transition material fluid according to claim 1.

13. The phase transition material fluid according to claim 3, wherein the alkenyl-substituted melamine comprises propenyl-substituted melamine; and the esterified melamine comprises triallyl 1,3,5-cyanurate.

14. The phase transition material fluid according to claim 3, wherein the propenyl-substituted melamine has a substitution degree of 2 to 3.

15. The phase transition material fluid according to claim 4, wherein the alkenyl-substituted triazine comprises propenyl-substituted triazine.

16. The phase transition material fluid according to claim 15, wherein the propenyl-substituted triazine has a substitution degree of 2 to 3.

17. The phase transition material fluid according to claim 7, wherein the anionic surfactant comprises an alkyl sulfate surfactant, an alkyl sulfonate surfactant or an alkylbenzene sulfonate surfactant, and the nonionic surfactant comprises a polyether surfactant.

18. The phase transition material fluid according to claim 9, wherein the peroxide initiator is one or more of dibenzoyl peroxide, lauroyl peroxide, cumene hydroperoxide, tert-butyl hydroperoxide, dicumyl peroxide, di-tert-butyl peroxide, tert-butyl peroxybenzoate, tert-butyl peroxypivalate, diisopropyl peroxydi-carbonate, dicyclohexyl peroxydi-carbonate and diethylhexyl peroxydi-carbonate.

19. The phase transition material fluid according to claim 10, wherein the benzene-based solvents is one or more of styrene, divinyl benzene, xylene and toluene.

20. The phase transition material fluid according to claim 11, wherein the pore-forming agent of generating gas by heating includes azobisisobutyronitrile or ammonium bicarbonate; the pore-forming agent of hot melt discharge comprises one or more of solid paraffin, dodecanol and heptane.

\* \* \* \* \*